United States Patent
Carvalho et al.

(10) Patent No.: US 6,817,651 B2
(45) Date of Patent: Nov. 16, 2004

(54) MODULAR VEHICULAR WINDOW SEAL ASSEMBLY

(75) Inventors: Darrel B. Carvalho, Mississauga (CA); William J. Konitsney, Troy, MI (US); A. John Rigby, Knoxville, TN (US); David T. Zwolinski, Maryville, TN (US)

(73) Assignee: Schlegel Corporation, New York, NY (US)

( * ) Notice: Subject to any disclaimer, the term of this patent is extended or adjusted under 35 U.S.C. 154(b) by 0 days.

(21) Appl. No.: 10/136,230

(22) Filed: May 1, 2002

(65) Prior Publication Data

US 2003/0205918 A1 Nov. 6, 2003

(51) Int. Cl.$^7$ ................................................. B60J 10/02
(52) U.S. Cl. ................................. 296/146.2; 296/146.15
(58) Field of Search ............................ 296/201, 146.2, 296/146.15, 93, 96.11, 96.21

(56) References Cited

U.S. PATENT DOCUMENTS

| | | | |
|---|---|---|---|
| 4,119,325 A | * 10/1978 | Oakley et al. ................. | 296/93 |
| 4,357,781 A | 11/1982 | Ohya et al. | |
| 4,761,916 A | 8/1988 | Sanok et al. | |
| 4,800,681 A | 1/1989 | Skillen et al. | |
| 5,007,202 A | 4/1991 | Guillon | |
| 5,010,689 A | 4/1991 | Vaughan | |
| 5,027,556 A | 7/1991 | Ginster | |
| 5,317,835 A | 6/1994 | Dupuy et al. | |
| 5,343,609 A | * 9/1994 | McManus ..................... | 29/451 |
| 5,396,733 A | 3/1995 | Dupuy | |
| 5,503,700 A | 4/1996 | Dupuy | |
| 5,538,777 A | * 7/1996 | Pauley et al. ................. | 296/93 |
| 5,557,890 A | 9/1996 | Levy et al. | |
| 5,566,510 A | 10/1996 | Hollingshead et al. | |
| 5,702,148 A | 12/1997 | Vaughan et al. | |
| 5,779,956 A | 7/1998 | Hollingshead et al. | |
| 5,846,463 A | 12/1998 | Keeney et al. | |
| 5,853,895 A | 12/1998 | Lewno | |
| 5,915,780 A | 6/1999 | Kobrehel et al. | |
| 6,023,888 A | 2/2000 | Dover | |
| 6,068,719 A | 5/2000 | Lewno | |
| 6,070,364 A | 6/2000 | Berry | |
| 6,082,048 A | 7/2000 | Backes et al. | |
| 6,189,198 B1 | 2/2001 | Keeney et al. | |
| 6,247,746 B1 | 6/2001 | Brush | |
| 6,260,905 B1 | 7/2001 | Wagner | |
| 6,279,987 B1 | 8/2001 | Keeney et al. | |
| 6,293,616 B1 | 9/2001 | Williams et al. | |
| 6,299,235 B1 | 10/2001 | Davis et al. | |
| 6,319,344 B1 | 11/2001 | Lewno | |

FOREIGN PATENT DOCUMENTS

| | | |
|---|---|---|
| DE | 3821457 | 12/1989 |
| DE | 19632843 | 9/1997 |
| EP | 0526327 | 2/1993 |
| EP | 0587428 | 3/1994 |
| GB | 2074639 | 11/1981 |
| GB | 2302558 | 1/1997 |
| JP | 361220919 A | * 10/1986 ................. 296/201 |

OTHER PUBLICATIONS

English Abstract of Patent Publication DE 19632843.
English Abstract of Patent Publication DE 3821457.
English Abstract of Patent Publication EP 0526327.

* cited by examiner

*Primary Examiner*—Jason Morrow
(74) *Attorney, Agent, or Firm*—Brian B. Shaw, Esq.; Stephen B. Salai, Esq.; Harter, Secrest & Emery LLP

(57) ABSTRACT

A vehicle window seal assembly includes a division bar formed without structural metal and including one of an insert or an overlay layer of a relatively soft material. The division bar can be formed in an H configuration having an elastic hinge between a leg of the H profile and a cross piece. The division bar can also be formed to receive and engage the insert to locate sealing lips for contacting a moveable glass panel.

40 Claims, 17 Drawing Sheets

MODULAR VEHICULAR WINDOW SEAL ASSEMBLY

FIELD OF THE INVENTION

The present invention relates to a motor vehicle window seal assembly, and more particularly, to a modular window seal assembly incorporating a fixed window and configured to operably engage a moveable window.

BACKGROUND OF THE INVENTION

Numerous vehicles, including sedans and minivans, have a fixed window and a moveable window, typically located, in a rear side door. The fixed window usually has a triangular shape and the moveable window typically has a rectangular shape.

The smaller fixed window is often referred to as a vent window, fixed window or fixed vent, and is usually required to avoid interference between the moveable window and the rear wheel well, when the moveable window is lowered. That is, by placing the larger rectangular moveable window forward of the fixed window, the larger moveable window can be completely lowered to a fully open position, while the fixed vent window does not detract from visibility of the driver or passengers.

As the moveable window slides upwardly and downwardly adjacent the fixed window, the molding or trim surrounding the fixed window must include a track or channel along a forward edge for slidable engagement with the moveable window. The resulting seal structure thus includes a portion between the two windows, as well as a portion extending outwardly to overlap an outer surface of the fixed window and the moveable window along adjacent edges.

Traditionally, a rear window seal assembly, that can accommodate the fixed window and the moveable window, is constructed of numerous parts, which must be tightly sealed to each other and the vehicle, to prevent water leakage or wind noise. The large number of channels, fasteners and seals typically implemented in the window seal assembly increases the potential for undesirable appearance or failure of functionality. While additional clips and fasteners have been proposed to facilitate securement of the seal assembly to the vehicle, the additional clips and fasteners increase cost of materials as well as increase cost for installation. In addition, a substantial portion of the weatherseal weight is due to the use of metal reinforcement in the weatherseal. It has been found that a substantial portion, even as much as 20% to 50% of weatherseal weight can be attributed to metal reinforcement or carriers typically employed in the weatherseal. As reduced weight provides increased fuel efficiency, there is a need to reduce the weight of the weatherseal.

In prior weatherseal constructions, a variety of materials have been used, such as thermoplastics, thermosets and metal. While each of these materials is separately recyclable, the construction of prior weatherseals has precluded economically viable separation of the various constituents for recycling.

Therefore, a need exists for a window seal assembly that can accommodate the spectrum of required seal functions, while providing an aesthetically pleasing appearance. The need further exists for the seal assembly to reduce installation time and complexity, thereby reducing installation costs. There is also a need to overcome the obstacles to recycling as presented by the traditional use of rubber, plastic and metal combinations within a given weatherseal.

SUMMARY OF THE INVENTION

The present vehicular window seal assembly incorporates a plurality of seal channels into a single seal assembly, wherein the single seal assembly can be readily installed in a vehicle. In addition, the present vehicular window seal assembly can be constructed of materials that are readily recovered and recycled from the seal assembly. In particular, configurations of the present invention can allow for economic recycling of thermoplastic components, as well separation of thermoplastic components from thermoset components upon completion of a useful life of the weatherseal.

In one configuration, the modular window seal assembly, includes a B-pillar; a header connected to the B-pillar; a division bar connected to the B-pillar; and a glass encapsulation connected to at least one of the header and the division bar, wherein the B-pillar, the header, the glass encapsulation and the division bar are free of a structural metal carrier. In a further construction, the elements of the window seal assembly are integrally connected, and can incorporate a fixed window.

In a further configuration, the division bar is constructed to be disposed between a fixed window and a moveable window, wherein the division bar includes a rigid polymeric material, including but not limited to thermoplastics, thermoplastic elastomers (TPEs) and thermoplastic vulcanizates (TPVs) or combinations thereof, forming an H shaped profile, free of a structural metal, the profile defining a first U-shaped channel sized to operably receive or engage the fixed window and a second U-shaped channel sized to operably receiver or engage a peripheral edge of the moveable window, and at least one flexible or deflectable sealing lip for contacting the moveable window. It is understood the sealing lip can be formed of an overlay layer of a relatively soft olefinic elastomer or thermoplastic including thermoplastic elastomers. The overlay layer can include sealing lips for contacting the moveable window, and be formed concurrently with the H-profile. In one construction, the H-profile includes a flexible hinge between one of the legs of the H-profile and a cross piece. Thus, by forming the window seal assembly and particularly the division bar, to be free of structural metals, the present assembly has a significantly reduced weight, and enhances recyclability. With respect to recycling, the body of the window seal assembly can be formed entirely of reprocessable thermoplastics, or can be formed in conjunction with a thermoset insert having sufficient resiliency as a sealing lip, wherein the insert can be economically removed to allow recycling of the thermoplastic materials. Alternatively, the window seal assembly can be formed of a thermoplastic, such as thermoplastic elastomer, body with a thermoplastic elastomer insert forming the sealing member, wherein separation of the insert is not required prior to recycling.

It is also contemplated the window seal assembly can be coextruded of two, or more, thermoplastic materials such as thermoplastic elastomers, as an integral construction, thereby reducing subsequent assembling steps associated with insert constructions.

In a further configuration, the H-profile is formed with the legs in a substantially parallel orientation, and the sealing lips are incorporated into a separately formed insert. The insert is retained within one of the channels of the H-profile to locate the sealing lips relative to the moveable window.

DETAILED DESCRIPTION OF THE PREFERRED EMBODIMENTS

Figure 1:
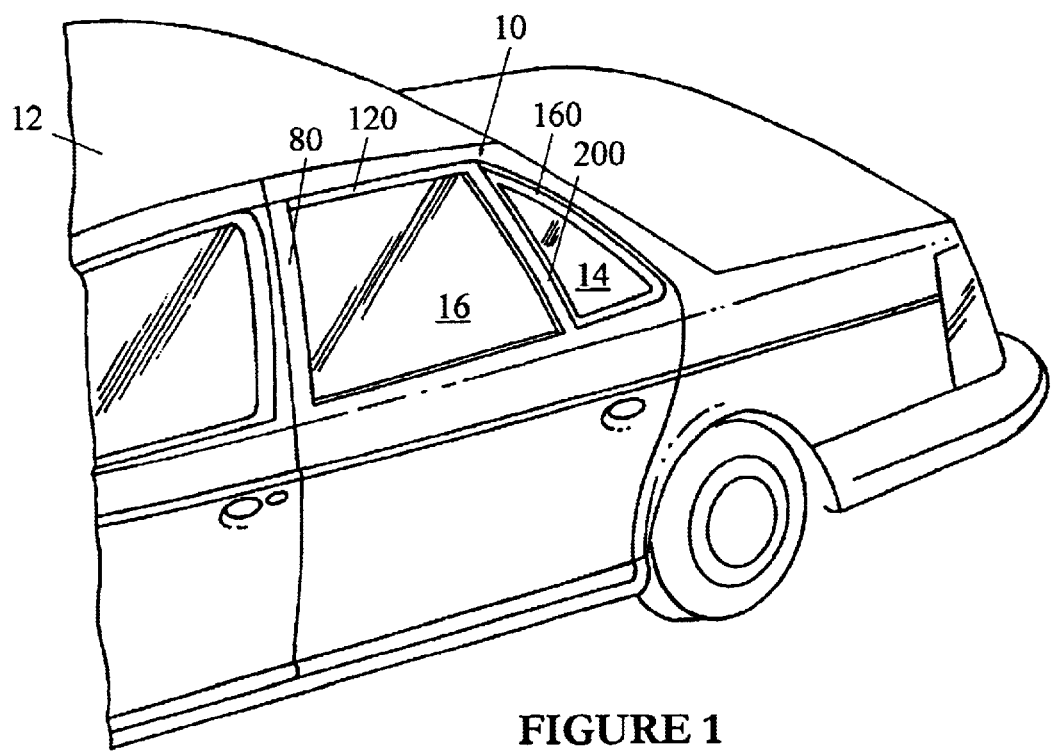
FIG. 1 is a partial perspective view showing one exemplary operable location of the present vehicle window seal assembly.

Referring to FIG. 1, a vehicular window seal assembly 10 is operably employed in a vehicle 12 having a fixed window 14 and a moveable window 16. Typically, the vehicular window seal assembly 10 is implemented in a rear side door of the vehicle 12. The vehicular window seal assembly 10 can be installed at the door or a panel of the vehicle 12 and substantially encase the fixed window 14 and a majority of the moveable window 16. The moveable window 16 can be raised and lowered relative to the fixed window and the vehicular window seal assembly 10 as known in the art.

Figure 2:
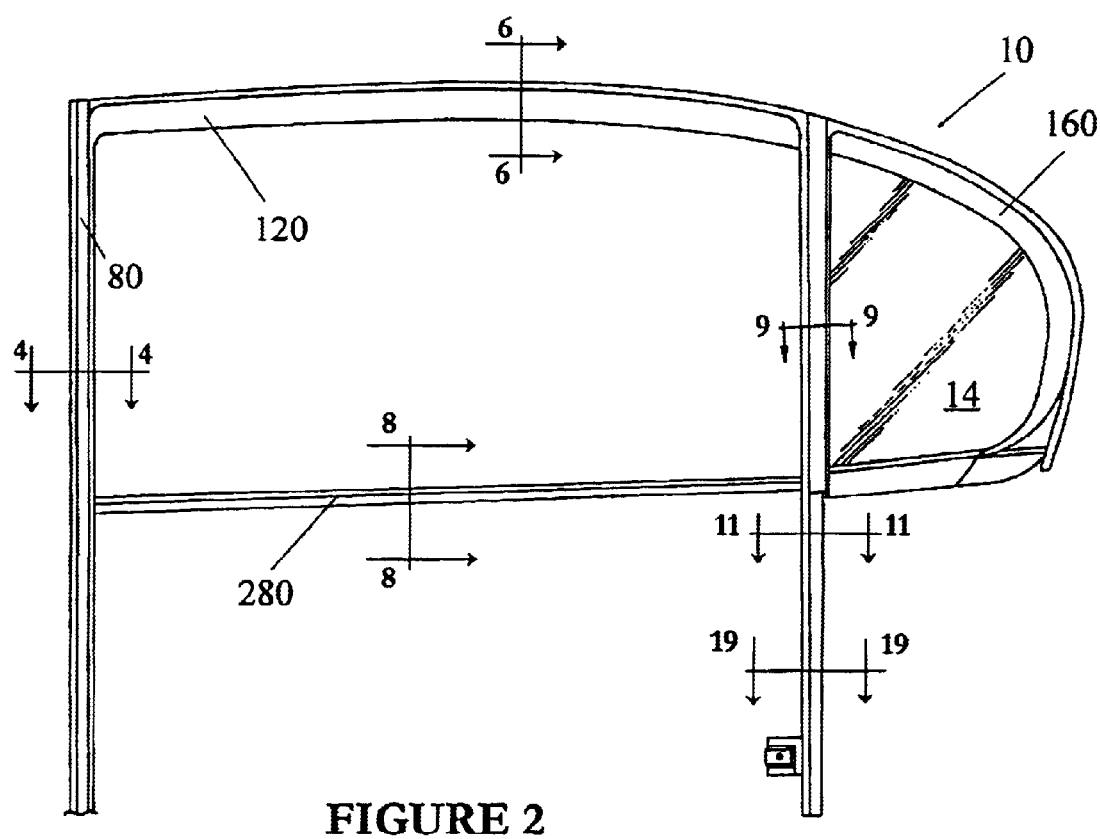
FIG. 2 is an isolated view of the window seal assembly incorporating a fixed window.
Figure 3:
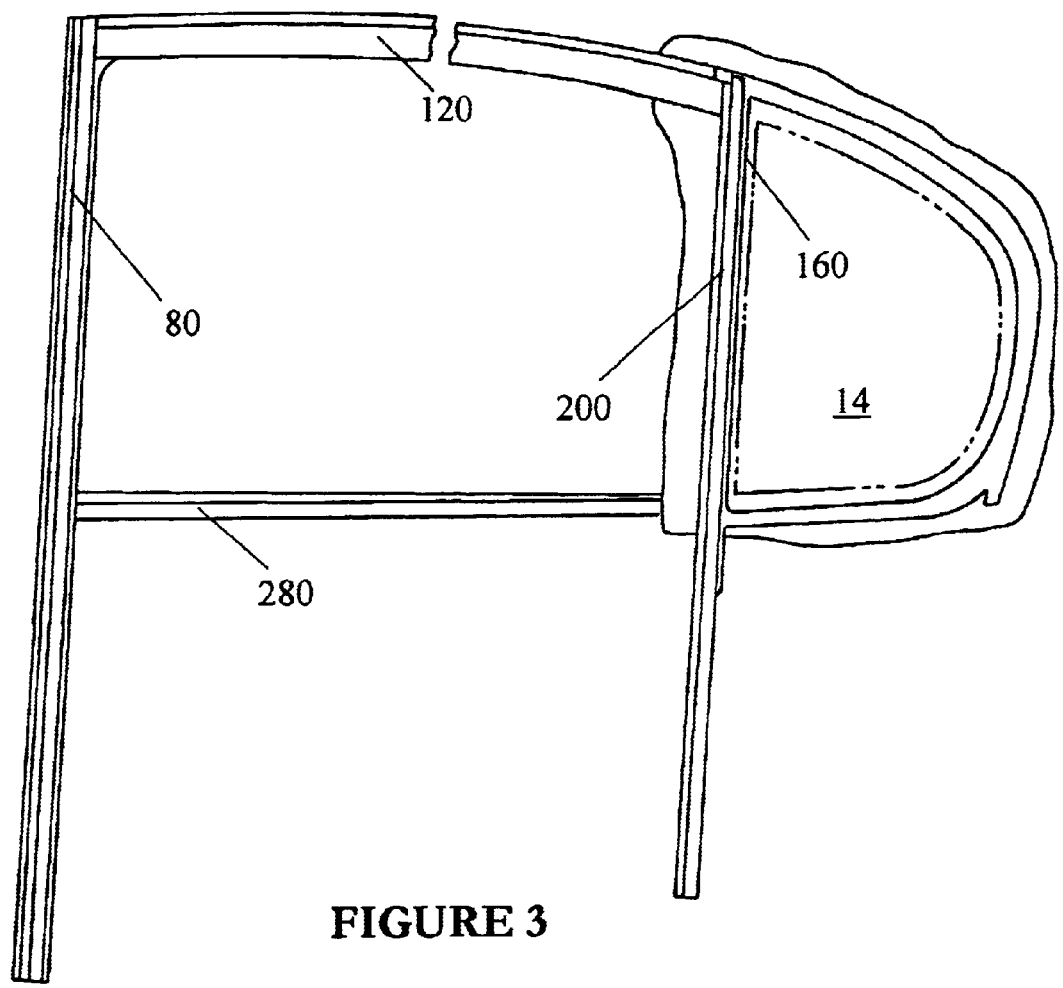
FIG. 3 is a side elevational view in partial cut away showing the window seal assembly operably installed in a vehicle.

Generally, as seen in FIGS. 1–3, the modular vehicular window seal assembly 10 includes a division bar 200, a B-pillar 80, a header 120 and a glass encapsulation 160.

Referring to FIGS. 2 and 3, the vehicular window seal assembly 10 forms a generally E-shaped member which at least substantially surrounds the fixed window 14 and three of the four peripheral edges of the moveable window 16. The fourth side of the window glass that remains within the door or body of the vehicle is sealed by a belt line seal 280 usually mounted thereon.

Division Bar

The division bar 200 extends along a portion of a periphery of the fixed window 14 and a portion of a periphery of the moveable window 16 (depending upon the position of the moveable window).

As seen in FIGS. 9–11, 13–15 and 17–19, in the operable installed configuration, the division bar 200 has a generally H-shaped cross section, including a relatively rigid H-profile (frame) 210 and at least one flexible or deflectable sealing lip 242, wherein the sealing lip 242 is typically located to contact the moveable window 16. As subsequently discussed, the sealing lip 242 can be formed as part of an flexible overlay layer 240, wherein the overlay layer is of a more flexible material than the H-profile 210.

The H-profile includes a first leg (first common side wall) 212, a generally parallel second leg (second common side wall) 214 and a cross piece 216 interconnecting the first leg and the second leg intermediate terminal ends of the first and the second U shaped legs.

The H-profile 210 of the division bar 200 forms a first, generally U-shaped channel (a fixed window channel) 215 for receiving and engaging a portion of the periphery of the fixed window 14 and a second generally U-shaped channel (a moveable window channel) 217 for receiving and guiding the moveable window 16. The cross piece 216 of the H-shaped profile 210 extends across and generally defines a closed end of the first and second channel 215, 217.

The overlay layer 240, if employed, is disposed over portions of the H-profile 210. The overlay layer 240 can be color matched to provide any of a desired number of colors. The overlay layer 240 can be a thermoplastic, including thermoplastic elastomers and thermoplastic vulcanizates, and configured to form the sealing lips 242. The sealing lip 242 contacts the moveable window 16 for forming a sealed interface therebetween. Alternatively, as described, the sealing lip 242 can be formed by an insert 250. The sealing lip 242 has sufficient flexibility and resiliency to repeatedly engage the moveable window 16 to formed a sealed interface therebetween.

Thus, the division bar 200 provides the fixed window channel 215 to engage and seal with the periphery of the fixed window 14 and the moveable window channel 217 including at least one sealing lip 242 for slideably engaging the moveable window 16, wherein the sealing lip is formed of a more resilient or softer material than the H-shaped profile. The material and construction of the sealing lip 242 is selected to permit the sealing lip to resiliently deflect upon contact with moveable window 16.

In contrast to prior constructions, the division bar 200 can be formed without structural metal. That is, the division bar 200 does not require a metal carrier or metal reinforcement for providing sufficient rigidity to perform the required functions. It has been found that sufficiently rigid polymers or polymer compounds including polypropylene, nylon or thermosets with a flexural modules typically of approximately 5.4 megapascals, or greater, can be employed to provide the necessary strength of the division bar 200.

However, it is understood the division bar 200 can include metal in the form of filler, trace amounts or colorants etc, and particularly those that do not inhibit subsequent recycling of the seal assembly components. Such metal is in contrast to the structural metal sufficient to reinforce the seal or provide structural rigidity or integrity of the seal.

Figure 15:
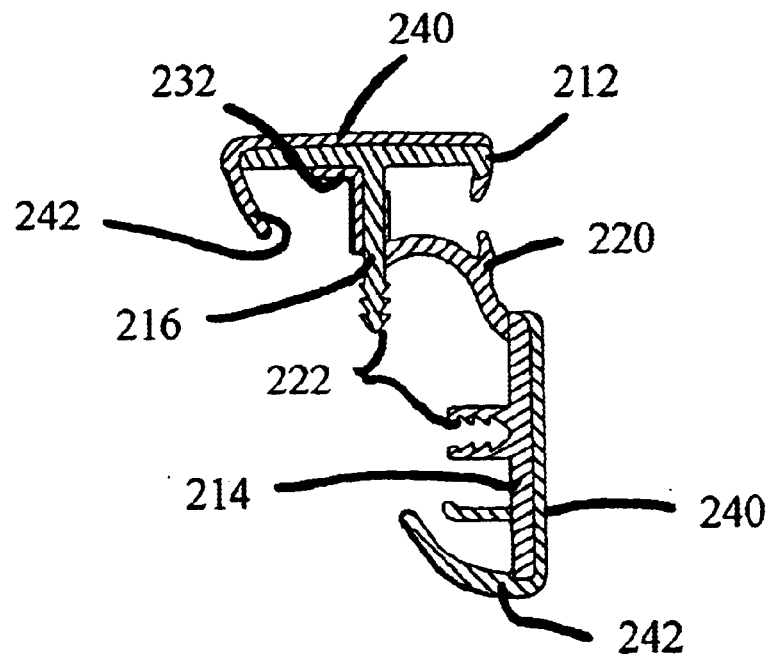
FIG. 15 is a cross sectional view of the division bar of FIG. 14 in a manufactured and unassembled configuration.
Figure 16:
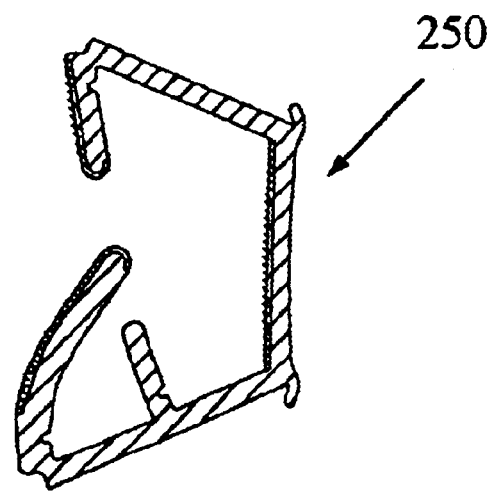
FIG. 16 is a cross sectional view of an insert in a manufactured and uninstalled configuration.
Figure 17:
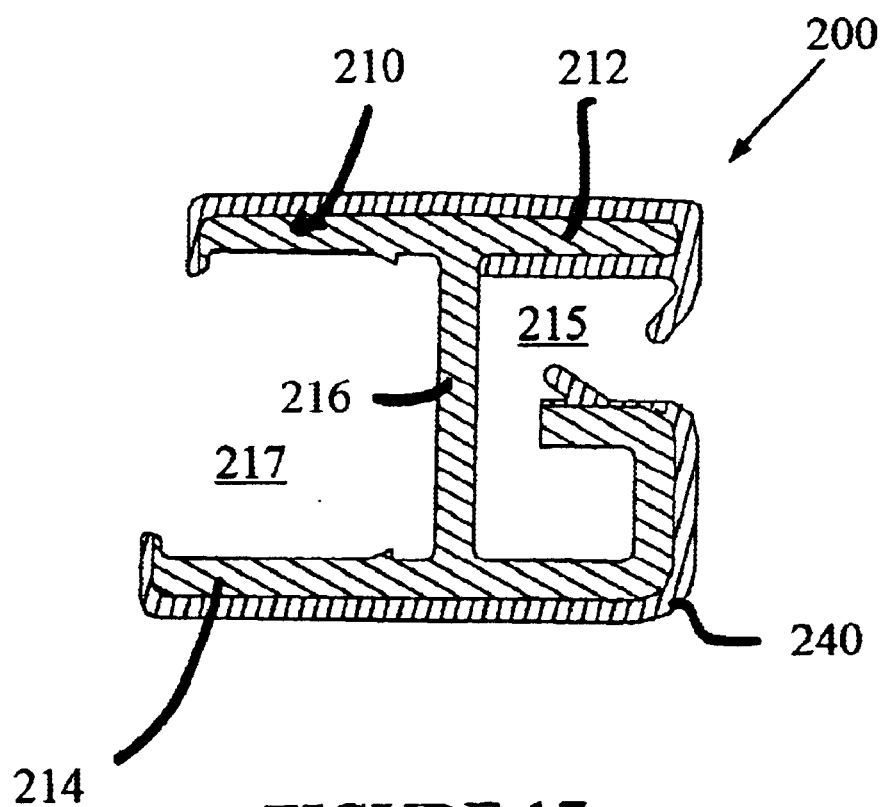
FIG. 17 is a cross sectional view of an H profile for receiving the insert of FIG. 16.
Figure 18:
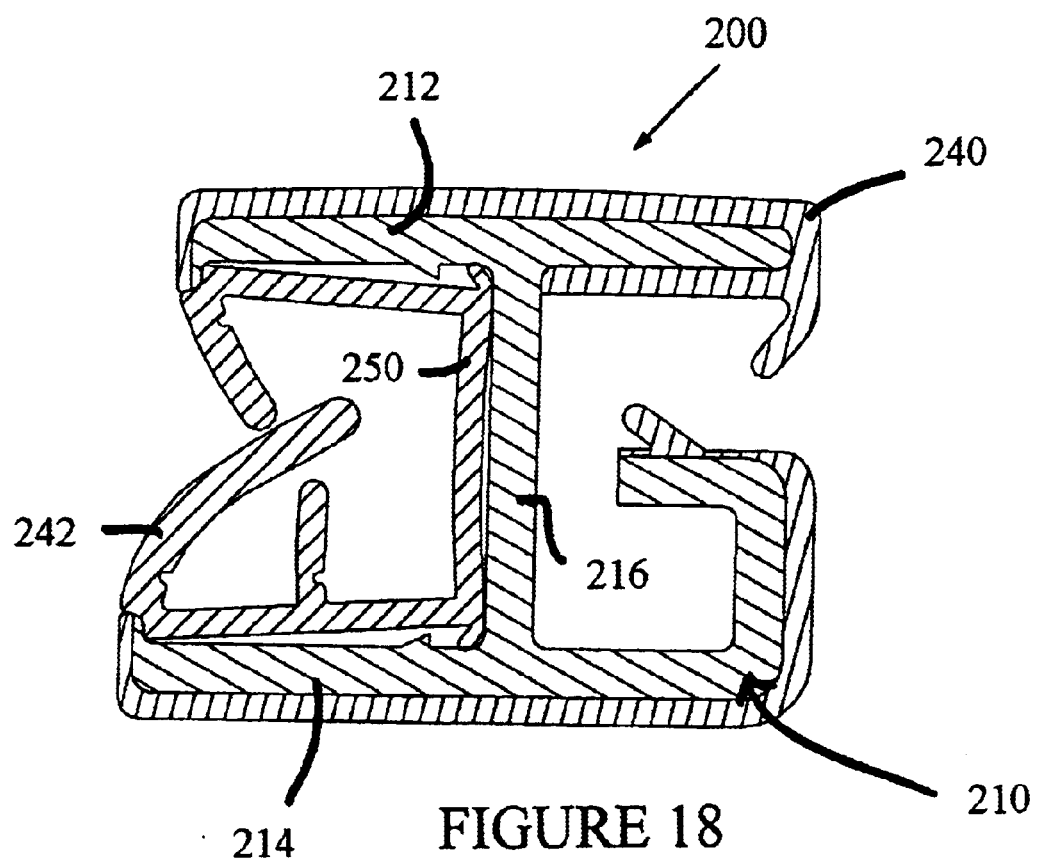
FIG. 18 is a cross sectional view of the division bar assembled from the components of FIG. 16 and FIG. 17.

Generally, the division bar 200 can be formed in a first hinge configuration (FIGS. 9–11 and 13–15) or a second insert configuration (FIGS. 16–18).

Hinge Configuration

In the hinge configuration, as seen in FIGS. 9–11 and 13, the H-profile (frame) 210 includes a hinge 220, or elastic joint intermediate one of the legs 212, 214 and the cross piece 216. Preferably, the hinge 220 is formed of a different material than the remaining portions of the H-profile 210, to exhibit an increased flexibility. It is understood the hinge 220 can be formed of the same material as the legs 212, 214, but of a configuration to exhibit the increased flexibility such as foam, blown, notched, or incorporating at least one line of weakness. In a preferred configuration, the material of the hinge 220 and the remaining portions of the H-profile 210 can be co-extruded. As the hinge 220 can be any of a variety of materials, with respect to the cross piece 216 and the legs 212, 214, the hinge is formed to be elastic or flexible relative to the legs and the cross piece.

Figure 13:
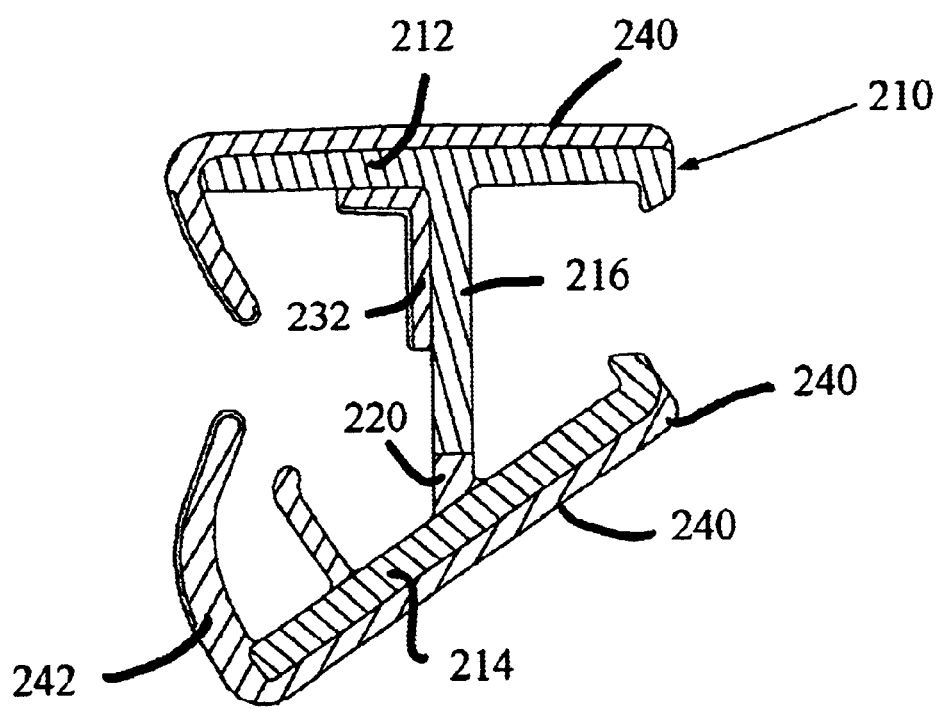
FIG. 13 is a cross sectional view of the division bar of FIGS. 9–11 in a manufactured and uninstalled configuration.

As shown in FIG. 13, in the first hinge configuration, upon formation of the H-profile 210 and hence division bar 200, the first and second legs 212, 214 are disposed in a non-parallel (splayed) orientation. If the overlay layer 240, and the sealing lips 242 are coextruded, the splay of the first and the second legs is preferably sufficient such that the sealing lips, in the moveable window channel, are in a non contacting or non interfering relation. The splay of the legs 212, 214 results in the fixed window channel having a relatively restricted opening defined by the terminal ends of the first and second legs. As described later, formation of the hinge configuration of the division bar 200 in the splayed orientation allows a single extrusion process to form the division bar. That is, the otherwise contacting sealing lips 242 are extruded in a spaced/splayed relation, which relation is different from the operable relation of the sealing lips 242 upon engagement of the division bar 200 with the fixed window 14.

The joint formed by the elastic hinge 220 allows for the first and second legs 212, 214 to be moved between the splayed non-parallel relationship (as formed) and the parallel (operable/installed) relationship. Thus, the hinge 220 allows the fixed window 14 to be disposed within the fixed window channel 215 of the H-profile 210, thereby causing the first and second legs 212, 214 to become substantially parallel and dispose the sealing lips 242 of the moveable window channel into the operable/abutting position.

Figure 14:
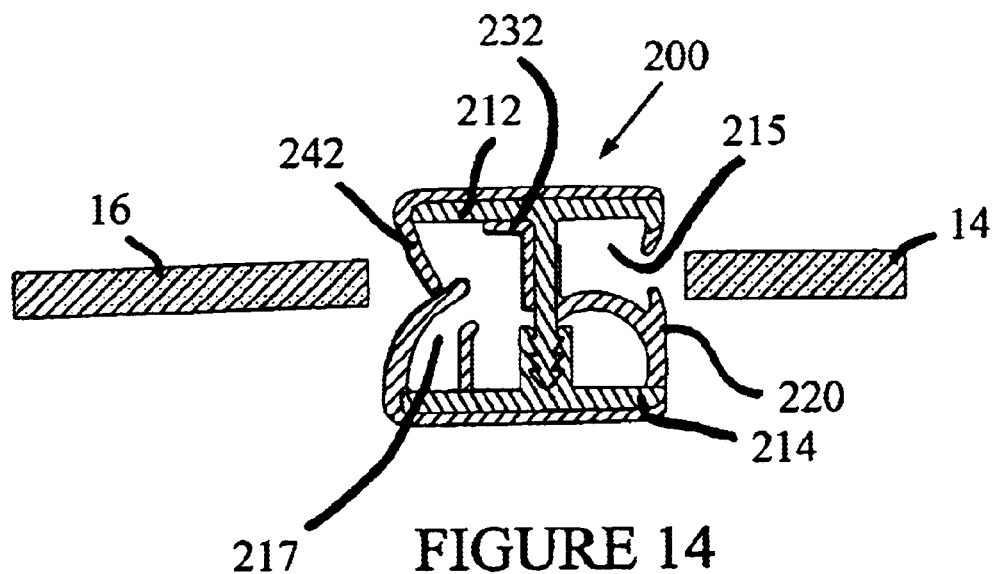
FIG. 14 is a cross sectional profile of an alternative construction of the division bar in an assembled configuration.

The hinge configuration of the division bar 200 can also be formed as shown in FIGS. 14 and 15. In this configuration, the flexible hinge 220 extends from the cross piece 216 to a spaced location on one of the legs 212, 214. The cross piece 216 is connected to the one of the legs to which the hinge 220 is connected by fastening, bonding, adhering, welding (such as ultrasonic), or an interlock 222. The interlock 222 can be a mechanical interlock and include snap fits, interlocking tabs and friction fits.

As seen in FIG. 14, the hinge 220 can form a glass locating component, in that the hinge disposes the periphery of the fixed window 14 in a predetermined location relative to the division bar.

As seen in FIGS. 9–11 and 13–15, the H-profile 210 can include a bearing strip 232 extending along a portion of one of the legs 212, 214 and the cross piece 216. The bearing strip is formed of a recycling compatible material as the remainder of the H-profile 210. In addition, the bearing strip can be formed to exhibit a desired hardness or coefficient of friction. Further, the bearing strip can include a surface coating to enhance or provide the desired characteristics of the bearing strip.

In one configuration, a rigid or semi-rigid TPE material forms the structural shape of the H-profile 210, that is, the first and second legs 212, 214 and the cross piece 216; and a flexible TPE forms the hinge 220 interconnecting the first leg and the cross piece.

The legs 212, 214 and cross piece 216 of the division bar 200 can be formed from a number of different plastic materials, for example, thermoplastics and thermoplastic elastomers (TPEs). Depending on the hardness, TPEs are sometimes categorized as thermoplastics and sometimes as elastomers. For purposes of this invention, no such distinction will be made, and hard and soft grades of plastic will all be referred to as TPEs.

TPEs are commercially available in several different brands and types. Each type can be obtained in different grades having different properties such as, hardness, tensile strength, compression, elongation, thermal stability and colorability. Selection of the appropriate TPE for a particular application depends on a suitable combination for such properties.

Types of TPEs which are particularly useful are styrenic block co-polymers, rubber polyolefin blends, elastomeric alloys, thermoplastic alloys, thermoplastic elastomeric alloys, thermoplastic isomers, thermoplastic polyurethanes, polyvinyl chlorides and blends thereof.

Styrenic block copolymers are commercially available in many types (and grades within types), for example, Kraton® from Shell Chemical Co. is based on block copolymers of styrene with a diene or an olefin pair, ethylene-butylene. The diene can be isoprene or butadiene.

The rubber-polyolefin blends (or thermoplastic polyolefins (TPOs)) are blends of various polyolefins with ethylene-propylene rubber (EPR) or ethylene-propylene-diene-monomer (EPDM). Suitable polyolefins include polypropylene and various types of polyethylene. Copolymers of propylene and ethylene and blends of TPOs can also be used. TPOs are also useful as modifiers of other TPEs.

Alloying is an interactive combination of two or more materials to give a material having better properties than those of the corresponding blend. Thermoplastic alloys are available with properties enabling them to be painted. Thermoplastic elastomeric alloys and elastomeric alloys (EAs) are composed of synergistic mixtures of two or more polymers that have been treated to give them properties different from simple blends of the major constituents. The two types of elastomeric alloys are melt processable rubbers (MPRs) and thermoplastic vulcanizates (TPVs).

EA-MPRs are a category of TPEs made of a highly plasticized, single phase combination of a chlorinated polyolefin, an ethylene-vinyl acetate copolymer and an acrylic ester mixture in which the rubber phase is highly crosslinked, for example, Alcryn® from E. I. du Pont Nemours, Inc. EA-TPVs are made of a rubber/plastic polymer mixture in which the rubber phase is fully crosslinked.

The plastic phase of a TPV is commonly a polyolefin (especially polypropylene), and the rubber phase is often an ethylene-propylene elastomer. A particularly useful TPV, suitable for windows seals, is formed from polypropylene and EPDM rubber and is commercially available in several grades as Santoprene® from Monsanto Chemical Co.

Thermoplastic polyurethanes (TPUs) are formed by copolymerization of diisocyanates with long-chain diols and short-chain diols. TPUs are available commercially in a number of types and grades, for example, Texin® from Mobay Corporation, Estane® from B. F. Goodrich Co., Pellethane®. from Dow Chemical Corp. and Q-Thane® from K. J. Quinn and Co., Inc.

Polyvinyl chloride (PVC) based TPEs are also suitable for window seals and are available in different grades and blends with other TPEs and rubbers. P-Valloy is one such material available from GBIE (Gerry Bareich Import Export Inc.) of Canada.

Thermoplastic ionomers are polymers containing interchain ionic bonding which affords tough, durable, transparent thermoplastics, for example, Surlyn® from E. I. du Pont de Nemours, Inc.

The substantially rigid portions of the H-profile 210, such as the legs 212, 214 and cross piece 216 are preferably formed from a rigid TPE. A rigid TPE, for example a polypropylene, preferably has a hardness in the range of 30 to 85 durometers, preferably 70 durometers, according to the Shore D scale. A semi-rigid TPE, for example Kraton®, has a hardness between 40 to 90 durometers preferably 70 durometers according to the Shore A scale.

In those configurations including the overlay layer 240, or where the overlay layer forms the sealing lips 242, the overlay layer can be formed from a softer more resilient TPE, for example Santoprene®, having a hardness in the range of 40 to 90 durometers, preferably 70 durometers according to the Shore A scale. The elastic hinge 220 is preferably formed from a TPE having a hardness in the range of 40 to 90 durometers, preferably 70 durometers according to the Shore A scale.

Such hard and soft TPEs are readily processed and fabricated, for example, by extrusion or molding and are particularly amenable to coextrusion and simultaneous molding of two or more TPEs of different durometer values. The TPEs are readily colored to match the vehicle either by incorporating pigment or by painting. Directly paintable TPE's have a high surface energy material blended into the base polymer to accept water based paints without any pretreatment. Various hardnesses of this material are available from Ferro Corporation.

The TPEs can be made with a high gloss finish, for example a Class A finish or a gloss of at least 60 numerical value when measured at a 60° angle with a gloss meter is readily obtained which is substantially higher than can be obtained with an EPDM rubber seal. It is desirable that the TPE meets the exterior weathering cycle per SAE J1960 with minimum change in color or gloss.

In the hinge configuration, the H-profile 210 is formed such that the first and the second legs 212, 214 are in a splayed nonparallel orientation and the overlay layer 240 with the sealing lips 242 can be co-extruded (of the same material as the legs, the overlay layer, or a different material) without interference of the extrusion molds forming the respective sealing lips. Thus, a single extrusion process can form the division bar 200.

The use of the hinge 220 allows the division bar 200 to be extruded in a single process as the legs 212, 214 are splayed, with respect to the moving panel channel 217, so that the sealing lips 242 can be commonly extruded. Thus, as the H-profile 210 is formed splayed, and upon engaging the fixed window channel 215 with a fixed window 14, the moving panel channel 217 is brought into operable position so that the sealing lips 242 contact each other and hence, the moveable window 16.

As the fixed window 14 and glass encapsulation 160 are disposed into the fixed window channel 215, the first and second legs 212, 214 are urged from the inclined orientation to a parallel orientation, as permitted by the hinge 220. Thus, operable engagement of the fixed window channel 215 with the fixed window 14 disposes the sealing lips 242 in the operable position and the fixed window provides structural rigidity along the length of the division bar 200.

The engagement of the division bar 200 with the glass encapsulation 160 and the fixed window 14 in conjunction with the rigidity of the legs of the H profile provides sufficient rigidity to the division bar to retain the moving window 16 as it travels in the moving window channel.

Figure 9:
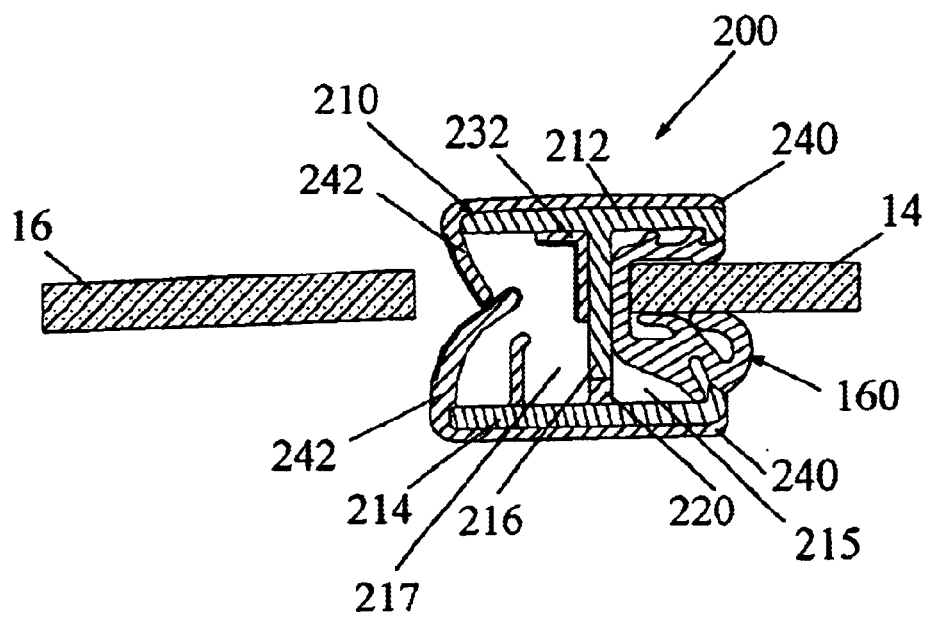
FIG. 9 is a cross sectional view taken along lines 9—9 of FIG. 2.
Figure 10:
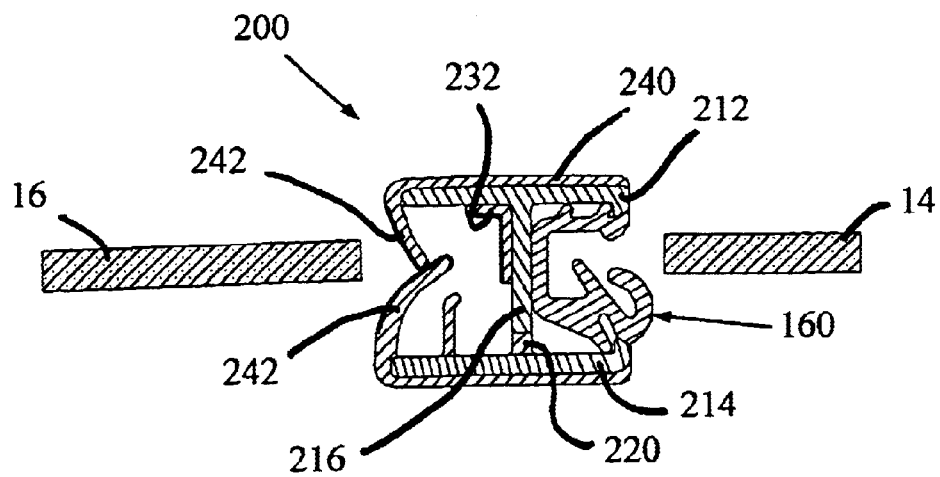
FIG. 10 is a cross sectional view of the division bar of FIG. 9, in an uninstalled configuration.
Figure 11:
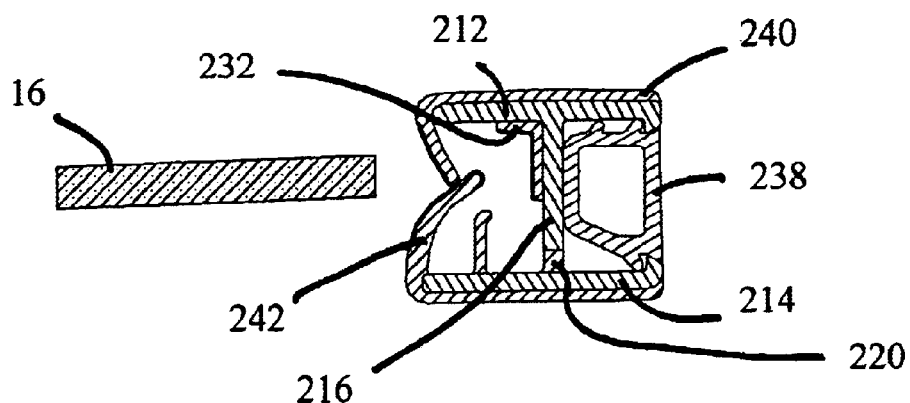
FIG. 11 is a cross sectional view of taken along lines 11—11 of FIG. 2.
Figure 12:
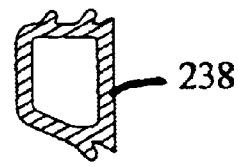
FIG. 12 is a cross sectional view of a spacing plug of FIG. 11.

As seen in FIGS. 9 and 10, the glass encapsulation 160 and fixed window 14 are operably received and retained within the fixed window channel 215 of the division bar 200. Operably locating the glass encapsulation 160 and the fixed window 14 ensures orientation of the H-profile 210 to properly locate the sealing lips 242 relative to the moveable window 16.

In the portion of the division bar 200 extending below the glass encapsulation, a slug 238 can be fit in the fixed window channel 215, so as to replace the glass encapsulation 160 and the fixed window 14.

Figure 19:
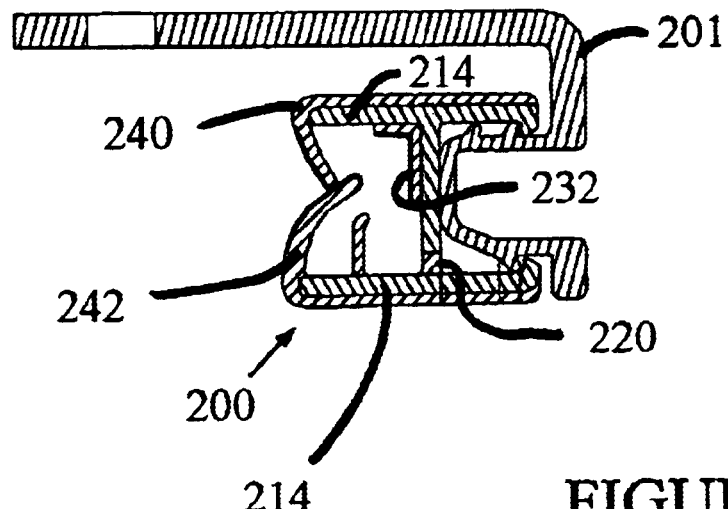
FIG. 19 is a cross sectional view taken along lines 19—19 of FIG. 2.
Figure 20:
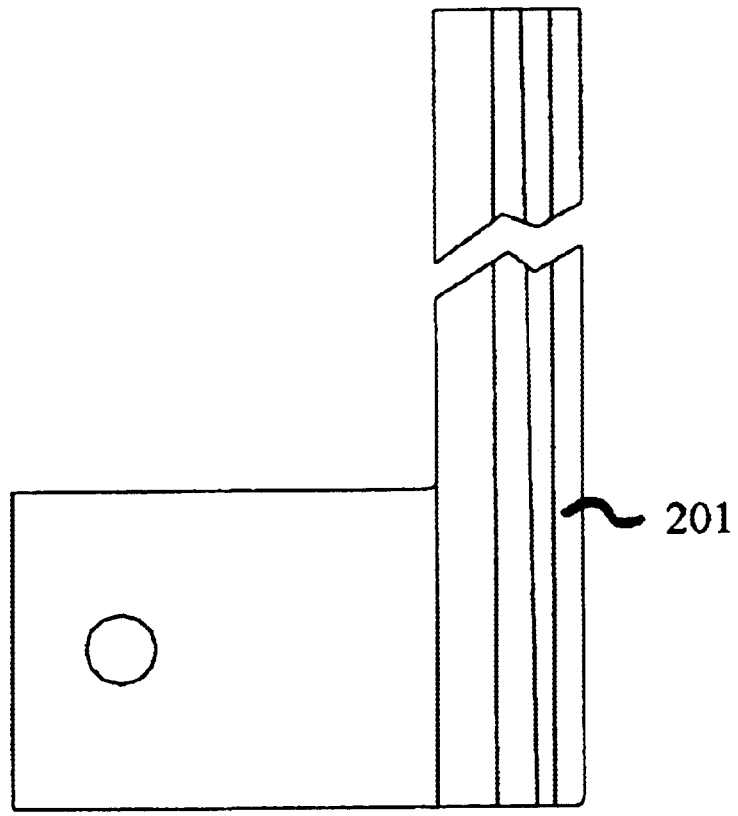
FIG. 20 is a side elevational view of a supporting bracket for engaging a portion of the window seal assembly.

Referring to FIGS. 19 and 20, the division bar 200 can cooperatively engage a bracket 201 for locating a lower portion of the division bar. Preferably, the bracket 201 is sized to mimic the glass encapsulation 160 and fixed window 14, thereby forcing the H-profile 210 into operable position with respect to the moveable window 16, as the moveable window translates below the belt line seal 280.

Figure 21:
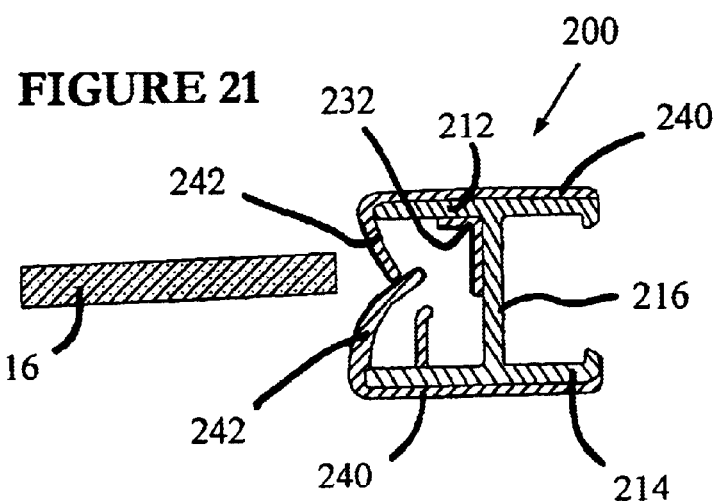
FIG. 21 is cross sectional view of a division bar showing a rigid H-profile, the profile having contacting sealing lips and being free of a hinge.

As seen in FIG. 21, it is further contemplated the division bar 200 can be formed by an extrusion process to provide at least one sealing lip abutting a part of the H-profile 210 or another sealing lip, and the H-profile does not include the hinge 220. That is, an extrusion of a first rigid material forming the H-profile 210 and a second more flexible material forming the sealing lip 242, can be made, wherein the H-profile is initially in a sufficiently splayed orientation to allow formation (extrusion) of the sealing lip. Downstream of the formation (extrusion) of the sealing lip 242, the H-profile is sized (shaped) of the extrusion is sized or formed by rollers or camming surfaces to transform the splayed H-profile to the operable orientation, wherein the legs 212, 214 are substantially parallel. Thus, the resulting division bar 200 is free of structural metal and does not include the hinge 220, and the division bar has a sealing surface, at least partially defined by the sealing lip 242, wherein the sealing lip projects from the H-profile to contact either a second sealing lip, a spaced part of the profile, or merely project into the U-shaped channel.

Figure 22:
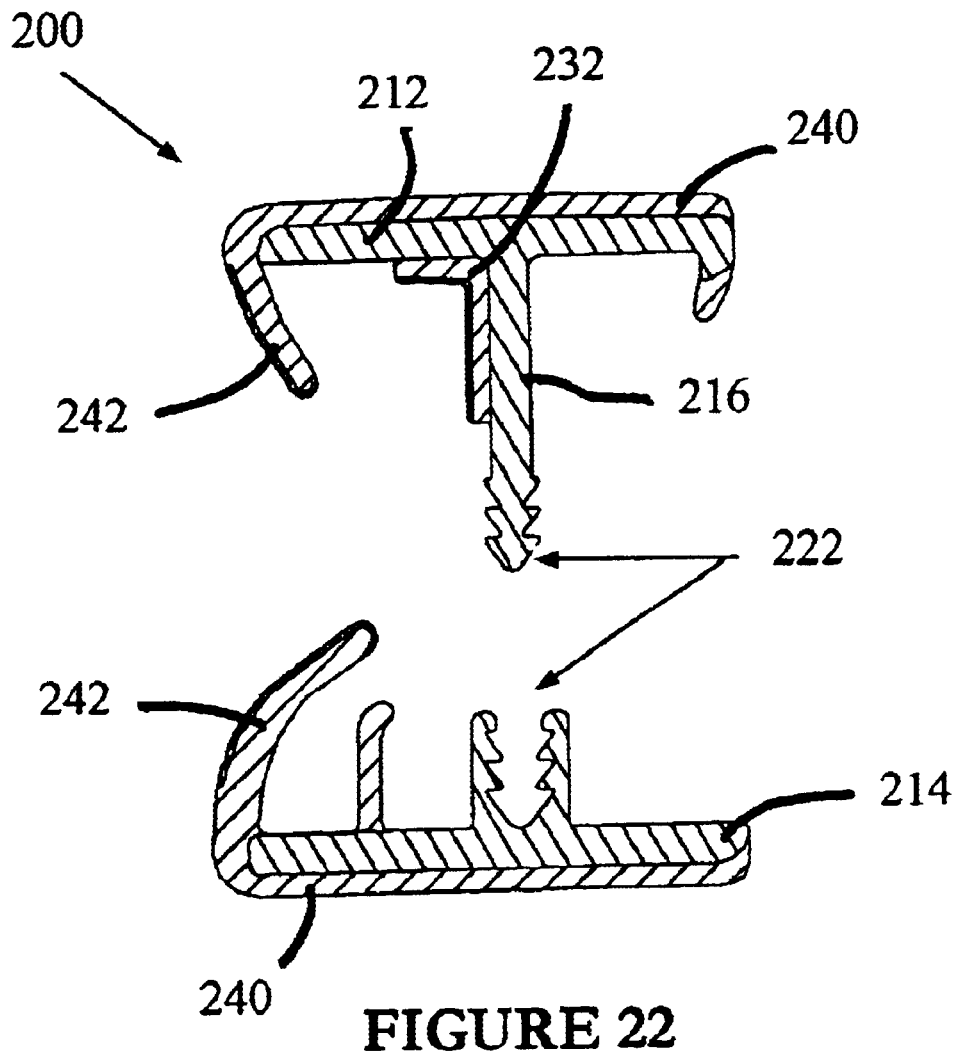
FIG. 22 is a cross sectional view of separately formable components of the division bar prior to assembly.

Referring to FIG. 22, the division bar 200 can be formed of two separate components which are subsequently interconnected by the interlock 222. As the H-shaped profile 210 is formed of separate components, the sealing lip 242 can be readily formed in the extrusion process, such that upon engaging the components together, the sealing lips abut, or overlap, in a configuration that cannot be otherwise extruded. The interconnection of the separate components can be accomplished in the processing line downstream of the extrusion of each component, or at an installation facility.

It is further recognized that connection of the sealing lip 242 to the H-profile 210 can be heat, thermal or fusion bonding, including ultrasonic welding, as well as adhesives or adhesive augmented bonding, or combinations thereof, such that unintended separation of the sealing lip from the H-profile is, at least substantially, precluded.

Insert Configuration

Referring to FIGS. 16–18, in the insert configuration of the division bar 200, the legs 212, 214 and the cross piece 216 of H-profile 210 are formed of the hard (rigid) extrudable thermoplastic, wherein cross piece 216 is directly connected to each leg and the legs are in a substantially parallel orientation. However, the H-profile 210 is not extruded with the sealing lips.

In this configuration, the overlay layer 240, if used, does not form the sealing lips 242. Such overlay layer 240 can be employed to provide a desired surface characteristic or finish on the outside of the legs 212, 214.

The sealing lips 242 are formed in a separate extrusion process in the form of the insert 250, wherein the insert can be formed of a relatively flexible material and in an open configuration such that the opposing sealing lips do not contact or abut during the extrusion process. Specifically, the insert 250 can be formed of the overlay material as previously set forth.

As seen in FIGS. 16–18, upon biasing the insert 250 to the closed position for operable engagement within the corresponding channel 217 of the H-profile 210, the sealing lips 242 generally contact along the length of the weatherseal.

As set forth in the description of the B-pillar 80, it is understood the H-profile 210 and the insert 250 can include cooperating features for retaining the insert in the moveable window channel 215. These features can include but are not limited to fins, barbs, hooks, snaps and detents.

It is understood the fixed window channel 215 can include any of a variety of structures for accommodating the thickness of the glass relative to the channel width and a desired orientation or existing orientation of the legs of the H-profile.

B-Pillar

Figure 4:
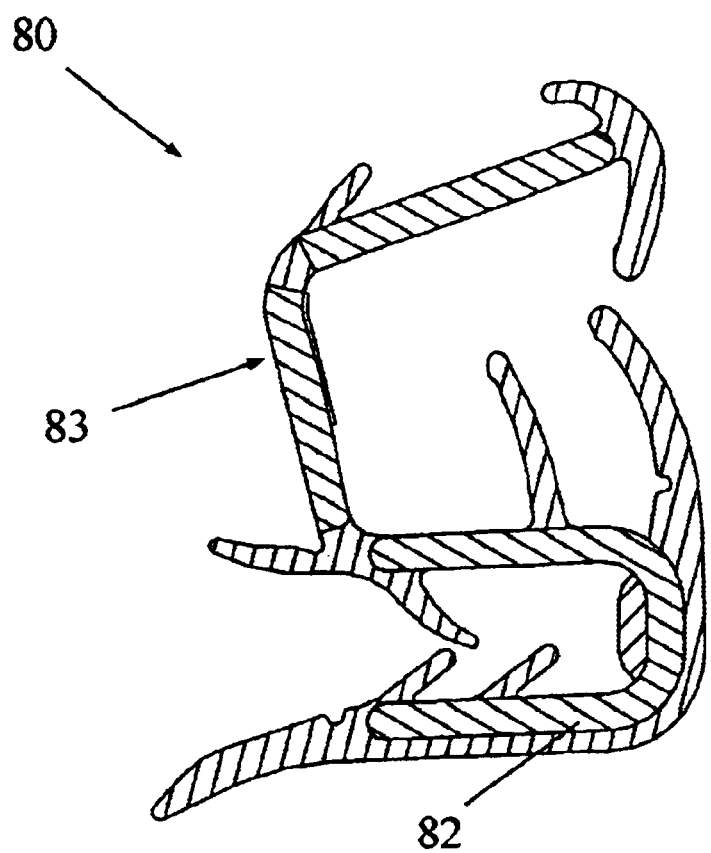
FIG. 4 is a cross sectional view taken along lines 4—4 of FIG. 2.

Referring to FIGS. 1 and 2, the B-pillar 80 extends along a forward peripheral edge of the moveable window 16. The B-pillar 80 defines channel for sliding engagement with the forward peripheral edge of the moveable window 16. The B-pillar 80 has a cross sectional profile as seen in FIG. 4. That is, the B-pillar 80 can be formed in a one-piece (multiple material) construction of FIG. 4 or an insert (multiple material) construction of FIG. 5. The B-pillar 80 can be separately formed from the header 120, the glass encapsulation 160 and the division bar 200. The B-pillar 80 is formed without a metal reinforcement or carrier in either an insert configuration or an integral configuration through the selection of materials.

Figure 5:
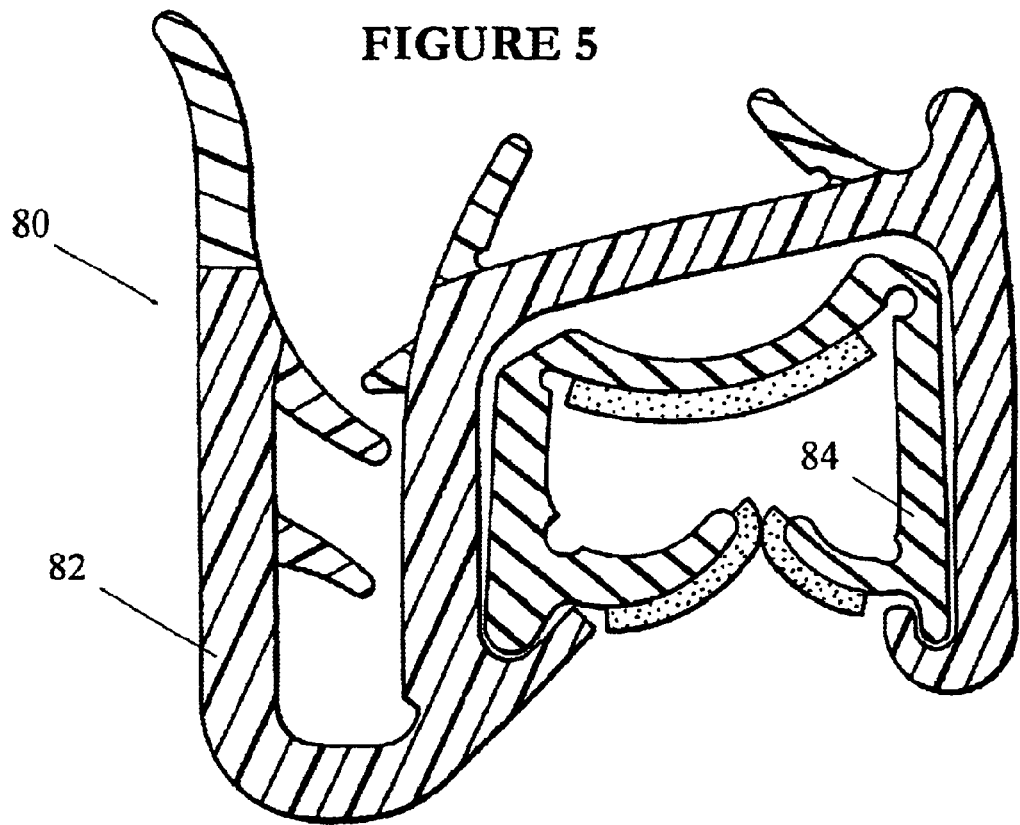
FIG. 5 is a cross sectional view of an alternative embodiment of the seal of FIG. 4.

Referring to FIG. 4, typically, the B-pillar 80 includes two major functional members, a generally U-shaped carrier 82 adapted to mount on a flange surrounding the window opening of the motor vehicle 12, and a resilient window engaging channel 83 (FIG. 4) or insert 84 (FIG. 5). However, it is understood the B-pillar 80 can be formed as dictated by a particular intended operating environment and therefore have a variety of constructions.

The carrier 82 includes a vehicle body engaging U-shaped flange gripping channel and a U-shaped window run channel. An outside surface of the carrier can include projections for engaging the body of the motor vehicle and forming the seal to the vehicle body. In addition, the carrier 82 is preferably provided with one or more soft, preferably high sliding resistance, locking projections for firmly securing the carrier to the vehicle body.

The ends of the legs of the window run channel have curved inwardly depending extensions forming short interior channels at the opening of the window run channel. The opposite end of the leg extends to provide a neat appearance with the vehicle body.

The carrier 82 is preferably formed from two different plastic materials, a substantially rigid, hard plastic and a soft plastic. The hard plastic is used to form the generally U-shaped frame comprising the legs, and the base. The soft polymer is used to form the projections.

The plastic portions of the B-pillar 80 can be formed from a number of different plastic materials, for example, thermoplastics and thermoplastic elastomers (TPEs) as set forth in the description of the division bar 200.

The resilient window engaging insert 84 is mechanically attached within the window run channel by two anchoring lobes that engage the curved extensions to secure the sealing insert in the window run channel of the car door. Additionally, or alternatively, adhesives, molding, heat staking, sonic staking or ultrasonic welding can be used to secure the insert to the channel.

The insert 84 which is preferably but not necessarily manufactured in an open, relatively flat configuration, is bent at its corners and inserted into the glass run channel of the car door. To aid fitting of the insert it can have multiple slits across its length or it can be punched out at the corners.

Preferably the surfaces of the insert 84 that engage the side surfaces of the window glass are provided with a sliding surface such as a slip coating or flocking. A similar sliding surface is provided to an inside surface of the insert 84 for engaging the edge of the window 16.

The sliding surface is any slip coating or flocking known to those skilled in the art, preferably flocking. Because the insert 84 can be made relatively flat, the flocking is easy to apply before the insert is folded and placed in the window run channel.

As set forth in the description of the division bar 200, the resilient insert 84 can be formed from a rubber, for example, natural rubber, styrene-butadiene rubber (SBR), ethylene-propylene rubber (EPR) or ethylene-propylene-diene-monomer (EPDM) rubber. A thermoplastic vulcanizate is preferred.

FIG. 5 shows the resilient insert 84 in the installed position after application of the sliding surface and illustrates how the insert engages and closes the channel.

The B-pillar 80 can be obtained by coextruding the thermoplastic elastomers of different durometer values to form a substantially rigid, dual durometer thermoplastic carrier in a one-piece generally U-shaped configuration, for receiving a resilient insert. In some applications, the extrusion is further subjected to thermal molding to conform to the shape of the vehicle body. The resilient insert 84 is formed by extruding a thermoplastic vulcanizate, in a generally flat configuration and curing the extrusion. Preferably, the flat extrusion is then provided with a sliding surface, for example, by flocking. The extruded insert 84 is then folded into the U-shaped carrier to mechanically secure them together, for example, by interlocking the anchor lobes of the insert with the curved extensions of the carrier 82. Additionally, or alternatively, adhesives, molding, heat staking, sonic staking or ultrasonic welding can be used to secure the insert to the channel.

Alternatively, the thermoplastic carrier of the B-pillar 80 is obtained by thermally molding the thermoplastic elastomers of different durometer values to form a substantially rigid, dual durometer thermoplastic carrier in a one-piece generally U-shaped configuration, for receiving the resilient insert 84. As shown, the B-pillar 80 is also free of structural metal.

Header

Figure 6:
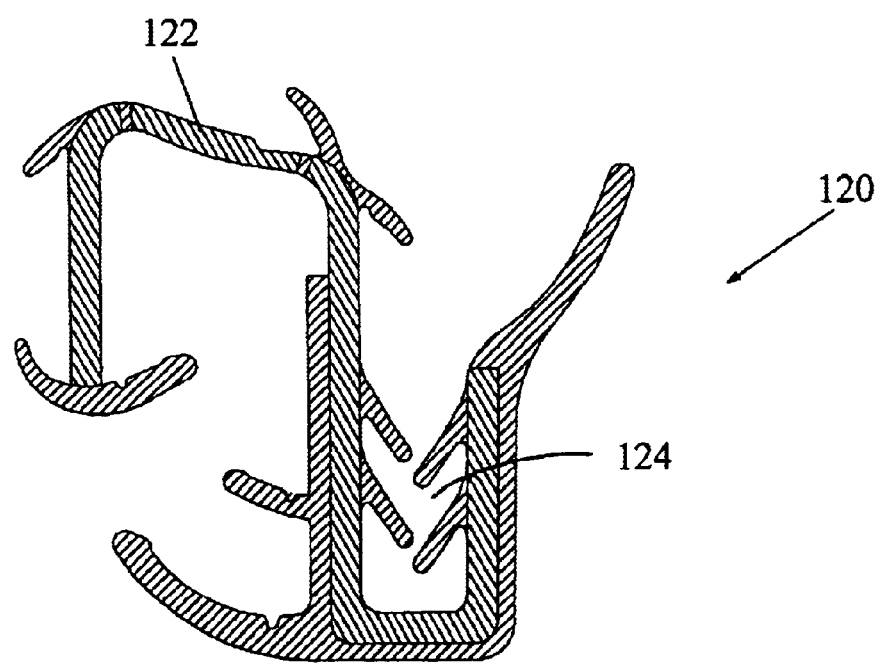
FIG. 6 is a cross sectional view taken along lines 6—6 of FIG. 2.
Figure 7:
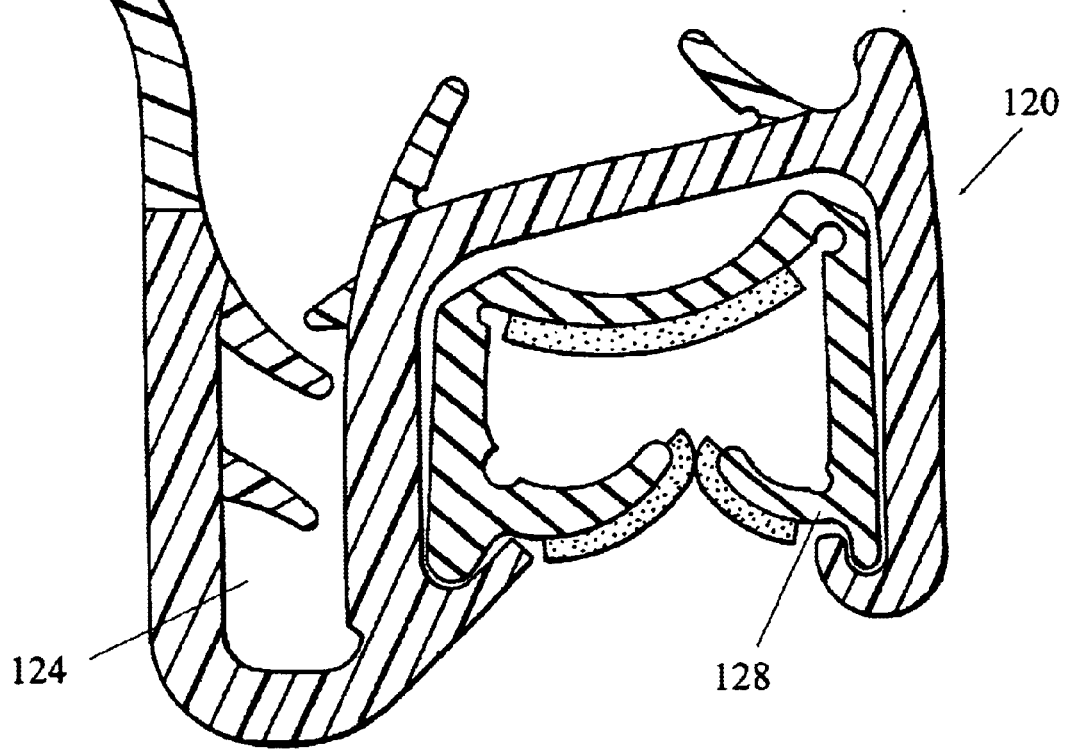
FIG. 7 is a cross sectional view of an alternative embodiment of the seal of FIG. 6.

As seen in FIGS. 1–3, the header 120 extends along an upper portion of the seal assembly 10 and is constructed to receive a top peripheral edge of the moveable window 16. As seen in FIGS. 6 and 7, the header 120 defines channel 122 as labeled in FIG. 6 for sliding engagement with the top peripheral edge of the moveable window 16 and a channel 124 for engaging a flange of the vehicle 12. The header 120 can be of a single piece (multiple materials). Construction of FIG. 6, or an insert construction (multiple materials) of FIG.

7. In the insert configuration, an insert 128 can be separable formed to be separately recycled The header 120 has a crass sectional profile as seen in FIG. 6. The header 120 can be separately formed from the B-pillar 80, the glass encapsulation 160 and the division bar 200. Preferably, the header 120 is formed without a metal reinforcement or carrier, the header 120 can be formed in a substantially similar manner to that of the B-pillar 80. As the header 120 can have a substantially similar structure as the B-pillar 80, the detailed description of the B-pillar can be expressly applied.

Glass Encapsulation

The glass encapsulation extends 160 along a rear peripheral edge of the fixed window 14. The glass encapsulation 160 engages with the rear peripheral edge of the fixed window 14. The glass encapsulation 160 has a cross sectional profile as seen in FIGS. 9 and 10. The glass encapsulation 160 can be separately formed from the header 80, the B-pillar 120 and the division bar 200. Preferably, the glass encapsulation 160 is formed without a metal reinforcement or carrier. The glass encapsulation 160 can be formed of any of the materials set forth for the B-pillar 80, the header 120 and the division bar 200.

It is contemplated the glass encapsulation 160 can encompass the entire periphery of the fixed window 14, so that the complete unit of the fixed window and glass encapsulation can be mated with the division bar 200. Alternatively, the glass encapsulation can be a substantially C shaped component, generally extending from the joint of the division bar 200 and the header 120, around the rear edge of the fixed window 14 to connect to the division bar in the area of the belt line seal 280.

Therefore, referring to FIGS. 2 and 3, the division bar 200 can be incorporated with the B-pillar 80, header 120 and glass encapsulation 160 to form a modular window assembly incorporating the fixed window. Thus, the modular window assembly can be formed without, or free of, structural metal, thereby enhancing the recyclability of the entire assembly.

Belt Line Seal

Figure 8:
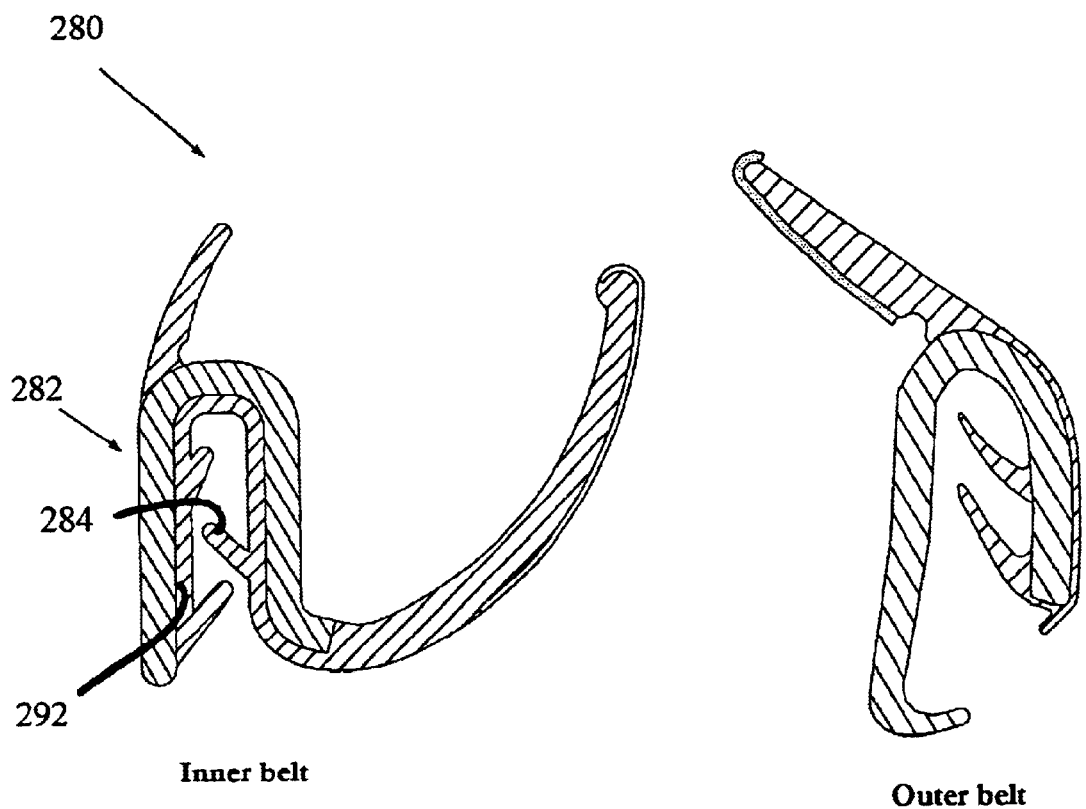
FIG. 8 is a cross sectional profile taken along lines 8—8 of FIG. 2, showing an inner belt and an outer belt.

Referring to FIGS. 2, 3 and 8, it is further contemplated that the belt line seal 280 can be incorporated to engage the B-pillar 80 and the division bar 200. The belt line seal 280 can also be formed without structural metal. The belt line seal 280 can be attached to the B-pillar 80 and division bar 200 before, during or after installation of the B-pillar and the division bar. While it is preferable, the belt line seal is formed without the structural metal to enhance recycling of the seal, it is understood the belt line seal 280 can include the structured metal and be readily separable from the B-pillar 80 and the division bar 200, thereby avoiding encumbering the recycling process.

Referring to FIG. 8, a typical belt line seal 280 is shown, having an inner belt and an outer belt, including a belt-line seal carrier 282. The belt-line seal carrier 282 has a generally inverted U-shaped body member adapted to engage a flange along the body of the door. The body member has a flange engaging inverted U-shaped channel 292 formed between an outer leg and an inner leg. The inner leg forms a portion of a U-shaped channel having a base and a third leg, the channel holding a trim panel. The flange engaging channel 292 is preferably provided with one or more soft gripping projections 284 for firmly securing the body member to the door frame. The leg has one or more inwardly depending locking extensions for engaging the trim panel. The end of the third leg of the U-shaped channel is provided with a projecting arm. A generally Y-shaped projection extends downwardly from the projecting arm. The projecting arm and a curved limb of the Y-shaped projection form a groove for receiving and securing the anchoring head of the belt-line extension. The arm and Y-shaped projection are flexible enough to be deflected by pressing projection when the belt-line extension is inserted, thus enabling the insertion. A trim projection on the arm covers the carrier 282.

Again, as with the B-pillar 80, the header 120, the glass encapsulation 160 and the division bar 200, the belt line seal 280 is free of structural metal.

The present invention provides for construction of a modular weatherseal assembly, wherein sections of the weatherseal assembly can be constructed in an insert configuration or an integral configuration. In the insert configuration, a main body (or carrier) portion can be formed of a first material and an insert formed of a second, typically more flexible, material selected to provide the engagement with a window. The insert and the main body can be formed of a different materials, wherein the first and the second materials have different recycling parameters. Thus, upon completion of the useful life of the weatherseal, the insert can be separated, (by physical separation, such as but not limited to pulling) from the body, thereby readily separating the first and second materials for recycling.

Further, if the first and second materials are compatible in the recycling process, such as a thermoplastic elastomer body and a thermoplastic elastomer insert, both sections can be recycled by the same process.

In the integral configuration, the body portion and the window contacting both are extruded together in at least a substantially simultaneous process whereby a single integral weatherseal is formed. In the integral configuration, the materials can be selected to provide compatible processing, necessary performance characteristics and common recycling requirements.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

What is claimed is:

1. A vehicular weatherseal division bar for operable location between a fixed window and a moveable window, the vehicular weatherseal division bar comprising:
   (a) an H-shaped rigid frame free of structural metal, the frame defining a first U-shaped channel and a second U-shaped channel, the first U-shaped channel adapted to receive a peripheral edge of the fixed window, the H-shaped frame including a flexible hinge; and
   (b) at least one deflectable sealing lip integrally connected to the H-shaped rigid frame and projecting into the second U-shaped channel, the sealing lip being of a different material than the H-shaped rigid frame.

2. The vehicular weatherseal division bar of claim 1, wherein the sealing lip is formed of a softer material than the H-shaped frame.

3. The vehicular weatherseal division bar of claim 1, wherein the H-shaped frame includes a thermoplastic.

4. The vehicular weatherseal division bar of claim 1, wherein the sealing lip is a portion of an overlay layer connected to the H-shaped frame.

5. The vehicular weatherseal division bar of claim 4, wherein the sealing lip includes a reduced friction coating.

6. The vehicular weatherseal division bar of claim 1, further comprising an overlay layer connected to the H-shaped frame and being of a different color than the H-shaped frame.

7. In a vehicular weatherseal division bar for operable location between a fixed window and a moveable window, the vehicular weatherseal division bar comprising:
  (a) an H-shaped rigid frame free of structural metal, the frame defining a first U-shaped channel and a second U-shaped channel, the first U-shaped channel sized to receive a peripheral edge of the fixed window, and the H-shaped frame including a pair of legs, a cross piece and a flexible hinge interconnecting the cross piece and one of the legs; and
  (b) at least one deflectable sealing lip projecting into the second U-shaped channel and located to releasably contact the moveable window.

8. The vehicular weatherseal division bar of claim 7, wherein the sealing lip is integrally connected to an insert, the insert sized to be received and retained in the second U-shaped channel.

9. The vehicular weatherseal division bar of claim 8, wherein the insert is formed of a more flexible material than the H-shaped frame.

10. The vehicular weatherseal division bar of claim 7, further comprising an overlay layer on a portion of the H-shaped frame.

11. The vehicular weatherseal division bar of claim 7, wherein the sealing lip is of a more flexible material than the H-shaped frame.

12. The vehicular weatherseal division bar of claim 7, wherein the H-shaped frame is moveable between a splayed orientation and a parallel leg orientation.

13. A vehicular weatherseal glass run channel assembly, for engaging a fixed window and a moveable window, the vehicular weatherseal glass run channel comprising:
  (a) an H-shaped thermoplastic frame having a pair of legs and a cross piece; and
  (b) a more flexible hinge interconnecting the cross piece and one of the legs.

14. The vehicular weatherseal glass run channel assembly of claim 13, further comprising at least one sealing lip projecting from the frame.

15. The vehicular weatherseal glass run channel assembly of claim 13, wherein the H-shaped frame is free of structural metal.

16. The vehicular weatherseal glass run channel assembly of claim 13, further comprising an overlay layer on an exposed portion of the H-shaped frame.

17. The vehicular weatherseal glass run channel assembly of claim 16, wherein the flexible overlay layer is a different color than the H-shaped profile.

18. The vehicular weatherseal glass run channel assembly of claim 13, wherein the legs and the cross piece are a rigid thermoplastic.

19. A vehicular weatherseal glass run channel assembly, for engaging a fixed window and a moveable window, the glass run channel comprising:
  (a) a thermoplastic first leg;
  (b) a thermoplastic second leg;
  (c) a deflectable sealing lip integrally connected to one of the first leg and the second leg; and
  (d) a thermoplastic cross piece extending from the first leg, the cross piece and the second leg defining an interlock for operably engaging the cross piece and the second leg to form an H-shaped frame.

20. The vehicular weatherseal glass run channel of claim 19, further comprising a resilient hinge extending from the cross piece to the second leg.

21. The vehicular weatherseal glass run channel of claim 20, wherein the hinge is formed of a material having a different resiliency than the first leg and the cross piece.

22. The vehicular weatherseal glass run channel of claim 20, wherein the hinge is formed of a thermoplastic elastomer.

23. The vehicular weatherseal glass run channel assembly of claim 19, wherein the interlock includes a projection on one of the second leg and the cross piece, and a corresponding recess on a remaining one of the second leg and the cross piece.

24. The vehicular weatherseal glass run channel assembly of claim 19, wherein the deflectable sealing lip is a different material than the first leg and the second leg.

25. A division bar for a vehicle weatherseal glass run channel assembly, the division bar engaging a fixed window and a moveable window, the division bar comprising:
  (a) an H-shaped frame being free of a structural metal carrier, the frame defining a first U-shaped channel and a second U-shaped channel, the H-shaped frame including a hinge, the frame being splayable about the hinge; and
  (b) an insert having a deflectable sealing lip, the insert sized to be received with the second U-shaped channel.

26. A modular window vehicular weatherseal assembly, comprising:
  (a) a B-pillar;
  (b) a header connected to the B-pillar;
  (c) a division bar connected to the header, the division bar having an H-shaped frame including a first leg, a second leg, a cross piece and a flexible hinge interconnecting the cross piece and one of the first leg and the second leg;
  (d) a glass encapsulation connected to the division bar; and
  the B-pillar, the header, the glass encapsulation and the division bar being free of a structural metal carrier.

27. The modular window vehicular weatherseal assembly of claim 26, further comprising a belt line seal connected to the B-pillar and the division bar.

28. The modular window vehicular weatherseal assembly of claim 26, wherein the division bar has an H-shaped frame defining a first U-shaped channel and a second U shaped channel, and an insert having at least one sealing lip, the insert sized to be received within the second U-shaped channel.

29. A vehicular wearherseal division bar for operable location between a fixed window and a moveable window, the vehicular weatherseal division bar comprising:
  (a) an H-shaped rigid frame free of structural metal, the frame defining a first U-shaped channel and a second U-shaped channel, the first U-shaped channel adapted to receive a peripheral edge of the fixed window, the U-shaped frame including a pair of legs and a cross piece, and a hinge interconnecting the cross piece and one of the legs; and
  (b) at least one deflectable sealing lip integrally connected to the H-shaped rigid frame and projecting into the second U-shaped channel, the sealing lip being of a different material than the H-shaped rigid frame.

30. The vehicular weatherseal division bar of claim 29, wherein the sealing lip is formed of a softer material than the H-shaped frame.

31. The vehicular weatherseal division bar of claim 29, wherein the H-shaped frame includes a thermoplastic.

32. The vehicular weatherseal division bar of claim 29, wherein the sealing lip is a portion of an overlay layer connected to the H-shaped frame.

33. The vehicular weatherseal division bar of claim 32, wherein the sealing lip includes a reduced friction coating.

34. The vehicular weatherseal division bar of claim 29, further comprising an overlay layer connected to the H-shaped frame and being of a different color than the H-shaped frame.

35. A vehicular weatherseal division bar for operable location between a fixed window and a moveable window, the vehicular weatherseal division bar comprising:

(a) an H-shaped rigid frame free of structural metal, the frame defining a first U-shaped channel and a second U-shaped channel, the first U-shaped channel adapted to receive a peripheral edge of the fixed window, the rigid H-shaped frame including a hinge and the rigid H-shaped frame being moveable about the hinge between a splayed orientation and an operable orientation; and (b) at least one deflectable sealing lip integrally connected to the H-shaped rigid frame and projecting into the second U-shaped channel, the sealing lip being of a different material than the H-shaped rigid frame.

36. The vehicular weatherseal division bar claim 35, wherein the sealing lip is formed of a softer material than the H-shaped frame.

37. The vehicular weatherseal division bar of claim 35, wherein the H-shaped frame includes a thermoplastic.

38. The vehicular weatherseal division bar of claim 35, wherein the sealing lip is a portion of an overlay layer connected to the H-shaped frame.

39. The vehicular weatherseal division bar of claim 35, wherein the sealing lip includes a reduced friction coating.

40. The vehicular weatherseal division bar of claim 35, further comprising an overlay layer connected to the H-shaped frame and being of a different color than the H-shaped frame.

* * * * *

UNITED STATES PATENT AND TRADEMARK OFFICE
CERTIFICATE OF CORRECTION

PATENT NO. : 6,817,651 B2
DATED : November 16, 2004
INVENTOR(S) : Carvalho, Darrel B. et al.

It is certified that error appears in the above-identified patent and that said Letters Patent is hereby corrected as shown below:

Column 2,
Line 12, after "as well" insert -- as --.
Line 32, delete "receiver" and insert -- receive --.

Column 3,
Line 21, after "view" delete "of".
Line 44, after "FIG. 21 is" insert -- a --.

Column 4,
Line 16, delete the last word "an" and insert -- a --.
Line 42, delete "formed" and insert -- form --.
Line 59, delete "modules" and insert -- module --.

Column 8,
Line 33, delete "of the extrusion is sized".

Column 11,
Line 2, insert a period after "recycled".
Line 2, delete "crass" and insert -- cross --.

Column 13,
Line 36, delete "more".

Column 14,
Line 53, delete "U-shaped" and insert -- H-shaped --.

Signed and Sealed this

Eleventh Day of April, 2006

JON W. DUDAS
*Director of the United States Patent and Trademark Office*